(12) United States Patent
Gardner et al.

(10) Patent No.: US 6,862,297 B1
(45) Date of Patent: Mar. 1, 2005

(54) WIDE RANGE FREQUENCY OFFSET ESTIMATION IN OFDM SYSTEMS

(75) Inventors: James M. Gardner, San Jose, CA (US); Vincent K. Jones IV, Redwoood Shores, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/469,715

(22) Filed: Dec. 21, 1999

(51) Int. Cl.[7] .......................... H04J 3/06; H04J 11/00; H04J 1/00; H04N 7/12; H04L 7/00
(52) U.S. Cl. ...................... 370/503; 370/208; 370/480; 375/240.28; 375/356
(58) Field of Search ................................ 370/208, 209, 370/210, 203, 480, 503, 507, 509, 350, 510, 512, 518, 481, 482; 375/354, 355, 316, 324, 375, 347, 260

(56) References Cited

U.S. PATENT DOCUMENTS

| | | | | |
|---|---|---|---|---|
| 5,282,222 A | | 1/1994 | Fattouche et al. ............. | 375/1 |
| 5,625,651 A | | 4/1997 | Cioffi .......................... | 375/354 |
| 5,732,113 A | * | 3/1998 | Schmidl et al. ............. | 375/355 |
| 6,097,776 A | * | 8/2000 | Mesiwala .................... | 375/355 |
| 6,252,908 B1 | | 6/2001 | Tore ........................... | 375/259 |
| 6,373,861 B1 | * | 4/2002 | Lee ............................ | 370/503 |
| 6,459,679 B1 | * | 10/2002 | Kim ........................... | 370/208 |
| 6,501,730 B1 | * | 12/2002 | Katsumoto .................. | 370/208 |
| 6,546,055 B1 | * | 4/2003 | Schmidl et al. ............. | 375/244 |
| 6,549,592 B1 | * | 4/2003 | Jones ......................... | 375/354 |
| 6,618,352 B1 | * | 9/2003 | Shirakata et al. ............ | 370/203 |

FOREIGN PATENT DOCUMENTS

| | | | |
|---|---|---|---|
| EP | 0823804 A2 | 2/1998 | ........... H04L/27/26 |

OTHER PUBLICATIONS

Nogami et al., "A Frequency and Timing Period Acquisition Technique for OFDM Systems", 1995, IEEE.
Schmidl et al., "Low–Overhead, Low–Complexity [Burst] Synchronization for OFDM", Stanford University.
Sandell et al., "Timing and Frequency Synchronization in OFDM Systems Using the Cyclic Prefix", Luleå University of Technology, Sweden.

* cited by examiner

*Primary Examiner*—Hanh Nguyen
(74) *Attorney, Agent, or Firm*—Ritter, Lang & Kaplan; Dan Lang; Dov Rosenfeld

(57) ABSTRACT

Systems and methods for wide offset frequency synchronization in OFDM communications. Frequency domain OFDM bursts include training symbols having known transmitted values in known frequency domain positions. Received values at the known training symbol positions are correlated from burst to burst. The magnitudes are used to establish and correct small integer frequency offsets as measured in frequency domain symbol widths. The phase of the correlation result is used to determine and correct integer frequency offsets that exceed the training tone spacing. Use of the phase to correct large frequency offsets greatly extends the acquisition range required for low cost analog components.

15 Claims, 6 Drawing Sheets

WIDE RANGE FREQUENCY OFFSET ESTIMATION IN OFDM SYSTEMS

STATEMENT OF RELATED APPLICATIONS

The present application is related to the subject matter of the following two U.S. Patent Applications:

U.S. patent application Ser. No. 09/245,168, filed on Feb. 5, 1999, entitled SYNCHRONIZATION IN OFDM SYSTEMS.

U.S. patent application Ser. No. 09/244,754, filed on Feb. 5, 1999, entitled ENHANCED SYNCHRONIZATION BURST FOR OFDM SYSTEMS.

These related patent applications are incorporated herein by reference.

BACKGROUND OF THE INVENTION

The present invention relates to digital communications and more particularly to synchronization of frequency between a receiver and a transmitter.

In an OFDM (Orthogonal Frequency Division Multiplexing) communication system, a channel to be used for communication is divided into subchannels that are orthogonal to one another in the frequency domain. Data is communicated in a series of time domain bursts. To form each time domain burst an IFFT is applied to a group of frequency domain symbols and a cyclic prefix is added to the transform result prior to transmission. Transmission may involve conversion of the transform result to an analog signal, conversion of the analog signal to an intermediate frequency (IF), then upconversion to a desired selectable carrier frequency prior to final amplification and propagation across a transmission medium. Upconversion is typically achieved by mixing the IF signal with a variable frequency oscillator signal. The carrier frequency is varied by varying the oscillator frequency.

On the receiver end, preamplification is followed by downconversion to IF from the carrier frequency, again by mixing with output of a variable frequency oscillator. The resulting IF signal is typically converted to a baseband digital symbol sequence. The cyclic prefixes are removed and an FFT is applied to recover the original frequency domain symbols.

For successful communication, the transmitter and receiver should have a precise shared understanding of the transmission frequency. In the exemplary system described above, this means that the variable frequency oscillators of the transmitter and receiver should be locked to each other. Imprecision with respect to the transmission frequency will cause inaccurate recovery of the OFDM symbols. To maintain system performance, it is desirable to always maintain frequency offset between a transmitter and a receiver to within 1% of the spectral width occupied by a single frequency domain OFDM symbol. When the receiver initially acquires the transmitter frequency, it is desirable that the synchronization system tolerates and corrects as wide as possible a frequency offset between the transmitter and receiver oscillators. This allows the use of much lower cost analog components for the receiver oscillator.

U.S. patent application Ser. No. 09/245,168, filed on Feb. 5, 1999, and entitled SYNCHRONIZATION IN OFDM SYSTEMS discloses various systems and methods for synchronizing the receiver frequency of an OFDM receiver to the transmission frequency of an OFDM transmitter. One such system provides a supplemental cyclic prefix that follows the cyclic prefix used to orthogonalize the frequency domain subchannels. At the receiver end, this supplemental cyclic prefix is correlated to the corresponding time domain symbols within the principle portion of the time domain burst in order to compute a fine frequency offset, that is a fractional component of the frequency offset as measured in OFDM frequency domain symbol widths. Once the fine offset is computed, it may be corrected by use of appropriate control signals to the receiver variable frequency oscillator. This procedure corrects for frequency offsets that are a fraction of a frequency domain symbol width but after this correction the received frequency may still be offset from the transmit frequency by an integer number of frequency domain symbol widths.

Correction of this integer frequency offset takes advantage of frequency domain structure within each OFDM burst. Each OFDM burst includes regularly spaced training symbols having known predetermined values. The training symbols facilitate estimation of the channel response at the receiver and correction of the integer frequency offset. The integer frequency offset is corrected by finding the frequency alignment that causes the received symbol values at the known training positions to correlate strongly between successive bursts.

It will be appreciated, however, that there is a limit to the acquisition range for this integer frequency offset correction technique. If the frequency offset is greater than the spacing between training symbols, then this offset correction technique may lock to a false alignment that differs from the correct alignment by an integer multiple of the training symbol spacing. The acquisition range is thus $$\pm \frac{N}{2\upsilon}$$

tones where N is the number of frequency domain symbols in a single OFDM burst and v is the number of frequency domain symbols reserved for training.

Consider a millimeter wave application where the operating frequency is 28 GHz and where use of low cost analog components may cause an initial frequency offset of 10 parts per million (ppm) or 280 KHz. A typical value, however, for $$\frac{N}{2\upsilon}$$

may be a small as 4 frequency domain symbol widths. In a representative system where the overall bandwidth of the OFDM system is 6 MHz and where N is 256, this provides an acquisition range of only approximately ±94 KHz or approximately ±3 ppm.

What is needed is a system for OFDM frequency synchronization that can correct for wide offsets that exceed the spacing between training symbols within the frequency domain bursts.

SUMMARY OF THE INVENTION

Systems and methods for wide offset frequency synchronization in OFDM communications are provided by virtue of one embodiment of the present invention. Frequency domain OFDM bursts include training symbols having known transmitted values in known frequency domain positions. Received values at the known training symbol positions are correlated from burst to burst. The magnitudes are used to establish and correct small integer frequency offsets as measured in frequency domain symbol widths. The phase of the correlation result is used to determine and correct integer frequency offsets that exceed the training tone spacing. Use of the phase to correct large frequency offsets greatly extends the acquisition range required for low cost analog components.

According to one aspect of the present invention, a method is provided for frequency synchronizing a second node to a first node in an OFDM communication system. The method includes receiving a series of time domain OFDM bursts from the first node at the second node and converting the series of time domain OFDM bursts into frequency domain OFDM bursts where the frequency domain OFDM bursts include selected symbols having known transmitted values. The method further includes determining interburst phase differences for the selected symbols and determining course frequency offset between the first node and the second node based on the phase differences.

Further understanding of the nature and advantages of the invention herein may be realized by reference to the remaining portions of the specification and the attached drawings.

DESCRIPTION OF SPECIFIC EMBODIMENTS

Figure 1:
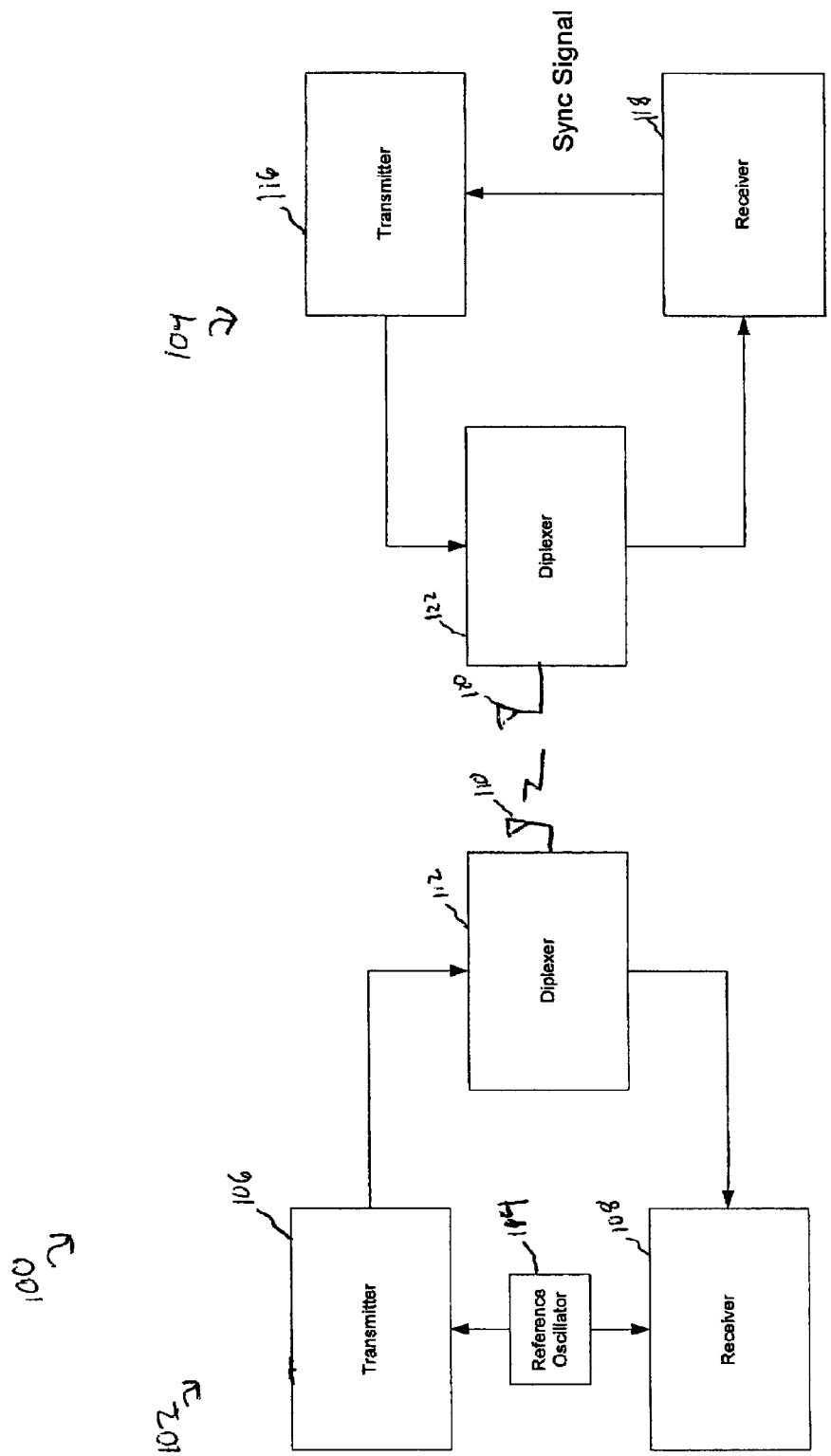
FIG. 1 depicts a point to point communication system suitable for implementing one embodiment of the present invention.

FIG. 1 depicts a point to point OFDM communication system 100 suitable for implementing one embodiment of the present invention. The present invention is, however, not limited in application to point to point communication systems may also be used in, e.g., point to multipoint communications systems, broadcast systems, etc. System 100 includes a first node 102 and a second node 104. First node 102 includes a transmitter 106 and a receiver 108. Transmitter 106 and receiver 108 share use of an antenna 110 by employing a diplexer 112. A reference oscillator 114 provides a frequency standard to both transmitter 106 and receiver 108.

Second node 104 includes a transmitter 116 and a receiver 118. Transmitter 116 and receiver 118 share use of an antenna 120 by employing a diplexer 122. Instead of employing its own reference oscillator, second node 104 synchronizes its operation frequency to the signal received from first node 102. Receiver 118 frequency synchronizes to its received signal and generates a synchronization signal to control the operation frequency of transmitter 116.

Figure 2:
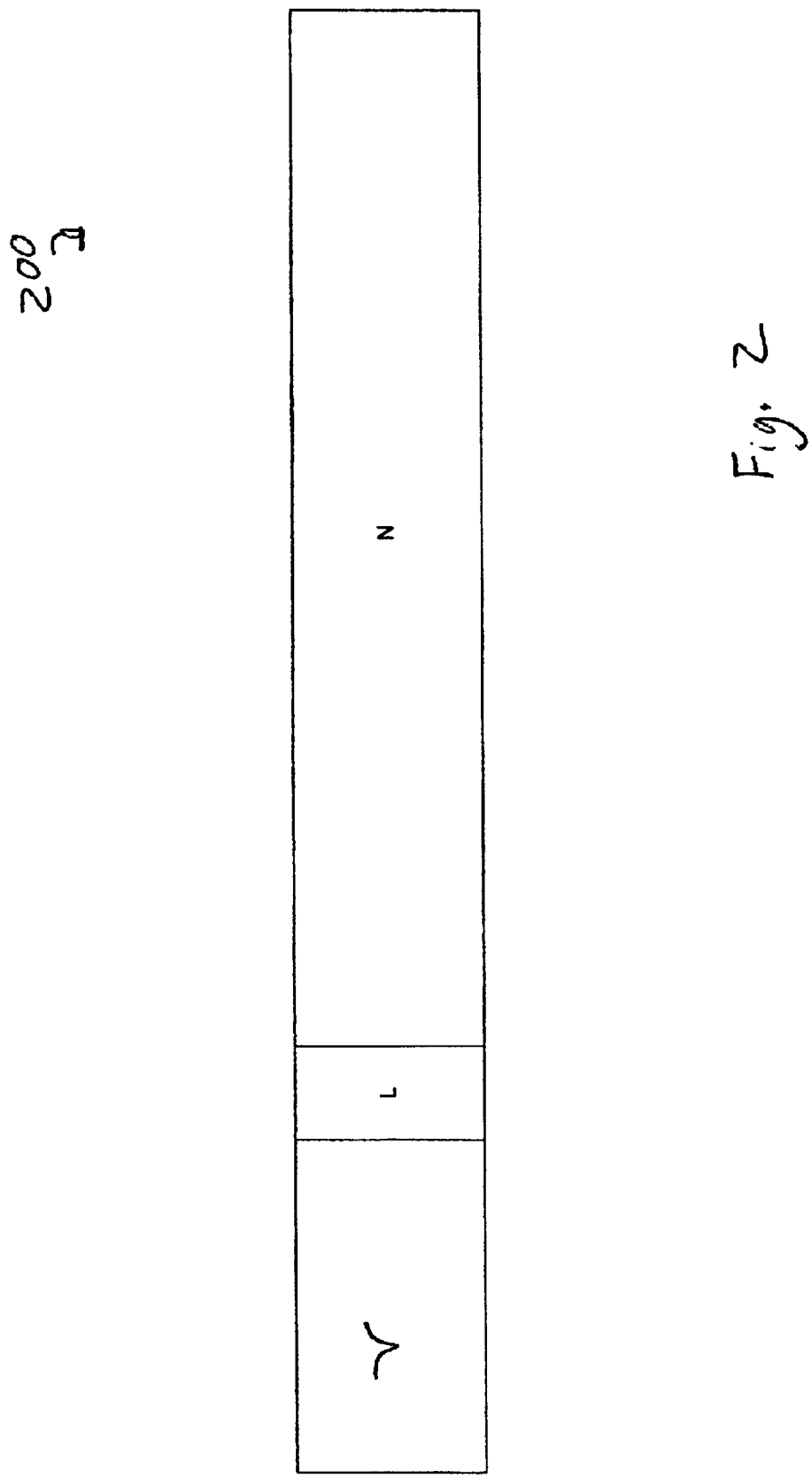
FIG. 2 depicts time domain structure of an OFDM burst as exploited by one embodiment of the present invention.

The frequency synchronization process described herein takes advantage of both time domain and frequency domain structure of OFDM bursts transmitted from first node 102 to second node 104. FIG. 2 depicts a time domain structure 200 of an OFDM burst as exploited by one embodiment of the present invention. Each burst includes a segment holding N symbols representing a result of applying the Inverse Fast Fourier Transform (IFFT) to an N symbol frequency domain burst. Furthermore, each burst includes a v symbol cyclic prefix followed by an L symbol supplemental cyclic prefix. The N symbols of the IFFT result follow the cyclic prefixes. Together, the cyclic prefix and supplemental cyclic prefix replicate the last v+L symbols of the N symbol IFFT result. The v symbol cyclic prefix assures reception of the frequency domain symbols input into the IFFT within orthogonal subchannels even in the face of dispersive channel conditions. The L symbols of the supplemental cyclic prefix are used to facilitate synchronization.

Figure 3:
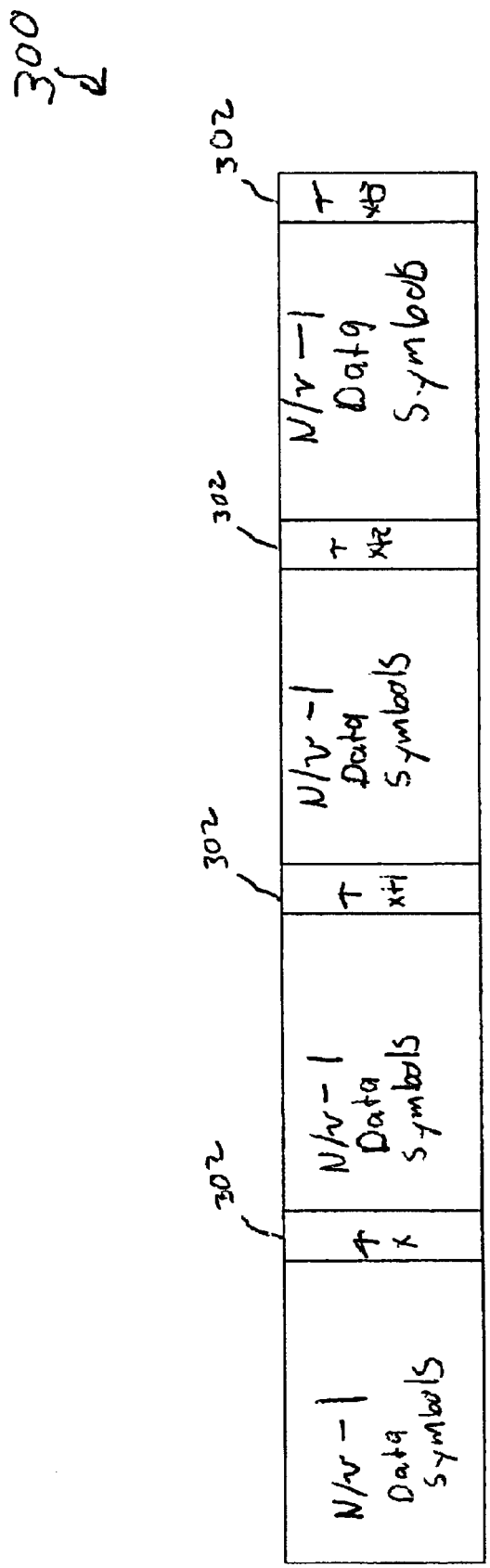
FIG. 3 depicts frequency domain structure of an OFDM burst as exploited by one embodiment of the present invention.

FIG. 3 depicts a portion of an OFDM frequency domain structure 300 exploited for synchronization purposes according to one embodiment of the present invention. The frequency domain structure includes v blocks, each block including one training symbol 302 and a group of N/v−1 data symbols. Training symbols 302 have known values and are used to estimate the response of the channel between first node 102 and second node 104.

Frequency offset, as measured in frequency domain symbol widths, may be understood as including an integer portion and a fractional portion. $f_{offset}=f_{int}+\Delta f_{offset}$ The synchronization process described herein first corrects for the fractional portion of the frequency offset and then corrects for the integer portion.

Figure 5:
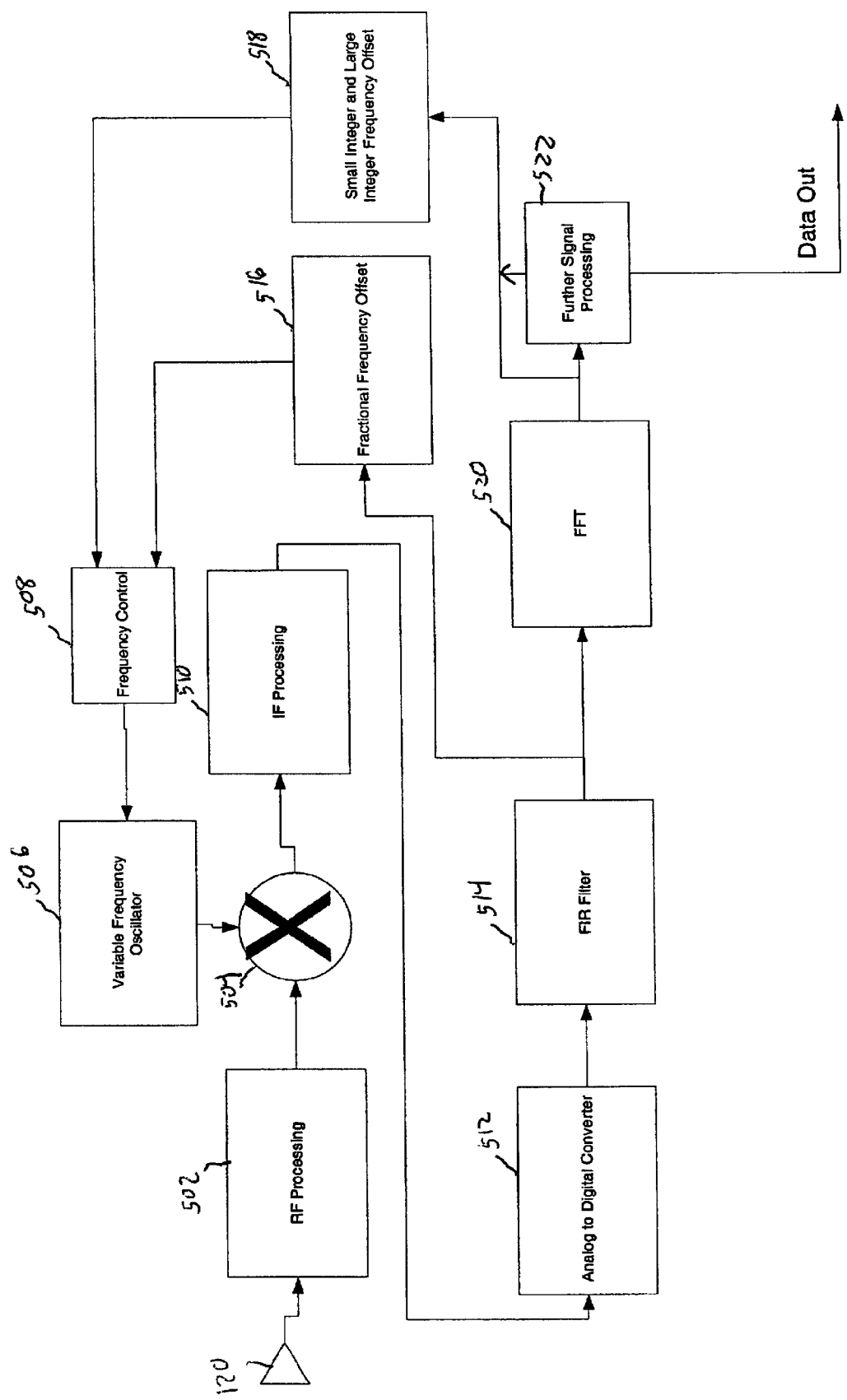
FIG. 5 depicts a receiver according to one embodiment of the present invention.

FIG. 5 depicts internal structure of receiver 118 of second node 104. Signals received via antenna 120 first go to a RF processing block 502 where low noise preamplification and filtering occur. A mixer 504 downconverts the processed RF signal to an intermediate frequency (IF) by mixing with the output of a variable frequency oscillator 506. The output frequency of variable frequency oscillator 506 as set by a frequency control block 508 determines the receive frequency of receiver 118. The IF signal is input into an IF processing block 510 which filters and amplifies at an IF frequency. There may be further downconversion to baseband or downconversion may be inherent in the operation of an analog to digital converter 512 which converts its input signal to a baseband series of complex symbol values. The baseband symbols are input to an FIR filter 514. The output of FIR filter 514 is a series of time domain OFDM bursts.

Figure 4:
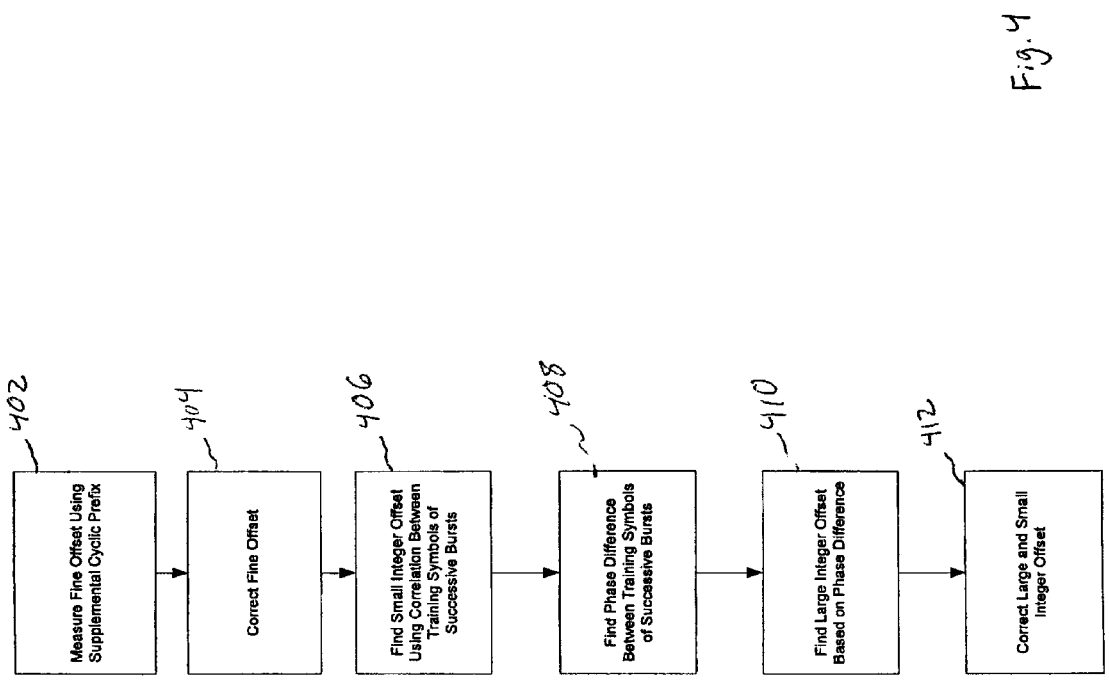
FIG. 4 is a flowchart describing steps of synchronization according to one embodiment of the present invention.

FIG. 4 is a flowchart describing steps of a frequency synchronization process according to one embodiment of the present invention. At step 402, a fractional frequency offset processing block 516 evaluates a cost function based on the fractional frequency offset. The cost function is evaluated using the following expression:

$$d(\delta) = \sum_{k=\delta-L+1}^{\delta} x^*(k)x(k+N)$$

where x(k) is a received time domain symbol value within structure 200, and where δ represents the position of the first of the N symbols in each time domain OFDM burst as determined by a timing synchronization process such as the one described in U.S. patent application Ser. No. 09/245, 168. The cost function will repeat every N+v+L samples. The fractional frequency offset cost function should be averaged over successive bursts by:

$$\overline{d}(\delta) = \sum_{k=0}^{K} d(\delta + k(N + v + L)) \forall \delta \in [0, N + v + L - 1]$$

The fractional frequency offset is then given by:

$$\Delta f_{\text{offset}} = \frac{1}{2\pi N} \tan^{-1} \frac{\text{Im}\,\overline{d}(\delta)}{\text{Re}\,\overline{d}(\delta)}$$

At step 404, frequency control block 508 adjusts the output frequency of variable frequency oscillator 506 to correct the fractional frequency offset determined in step 402. An integer offset may however remain.

The integer offset is determined by computing a correlation between frequency domain symbol values of successive bursts that occupy positions reserved for training symbols. The magnitude of the correlation signal is used to determine small integer offset, i.e., a component of the integer offset that is less than the spacing between training symbols in structure 300. The phase portion of the correlation is used to determine the large integer component of offset, i.e., how many groups of N/v symbols are in the integer offset.

An FFT block 520 removes the cyclic prefix from successive OFDM time domain bursts output by FIR filter 514 and converts the bursts to the frequency domain. An integer frequency offset processor 518 determines the small and large integer offsets based on the frequency domain symbols output by FFT block 520.

The small integer offset is determined by first forming:

$$Y(n) = \sum_{k=0}^{K} X^*(n, k) X(n, k+1)$$

where X(n,k) is the the received frequency domain value at frequency domain symbol n and burst k and K is a number of successive bursts over which Y(n) is evaluated, e.g., 40.

A cost function, $e_j$, is calculated over groups of N/v frequency domain symbols by $$e_j = \sum_{n \in J_j} Y(n) \text{ where e.g., } N/v = 8 \text{ and } j \in [-4, 3]$$

where $J_j$ is the set of v frequency indices corresponding to the training symbol positions, and equally spaced by N/v.

$$J_j = \left[ jj + \frac{N}{v} \ldots \right]$$

Small integer offset is determined based on a magnitude of a cost function determined by correlating successive pairs of bursts.

$$f_{\text{small}} = \arg\max_j |e_j|^2$$

The large integer offset is determined based on a phase difference between training symbols of successive bursts. There is a phase difference, $\phi$, between frequency domain symbol, n, at burst k and the same frequency domain symbol at burst k+1. The sign of the phase difference and its magnitude are directly proportional to the total integer frequency offset including both the large and small frequency offsets and can be expressed as:

$$\phi(f_{\text{int}}) = 2\pi f_{\text{int}} \frac{v + L}{N} \bmod 2\pi \forall\, n$$

Figure 6:
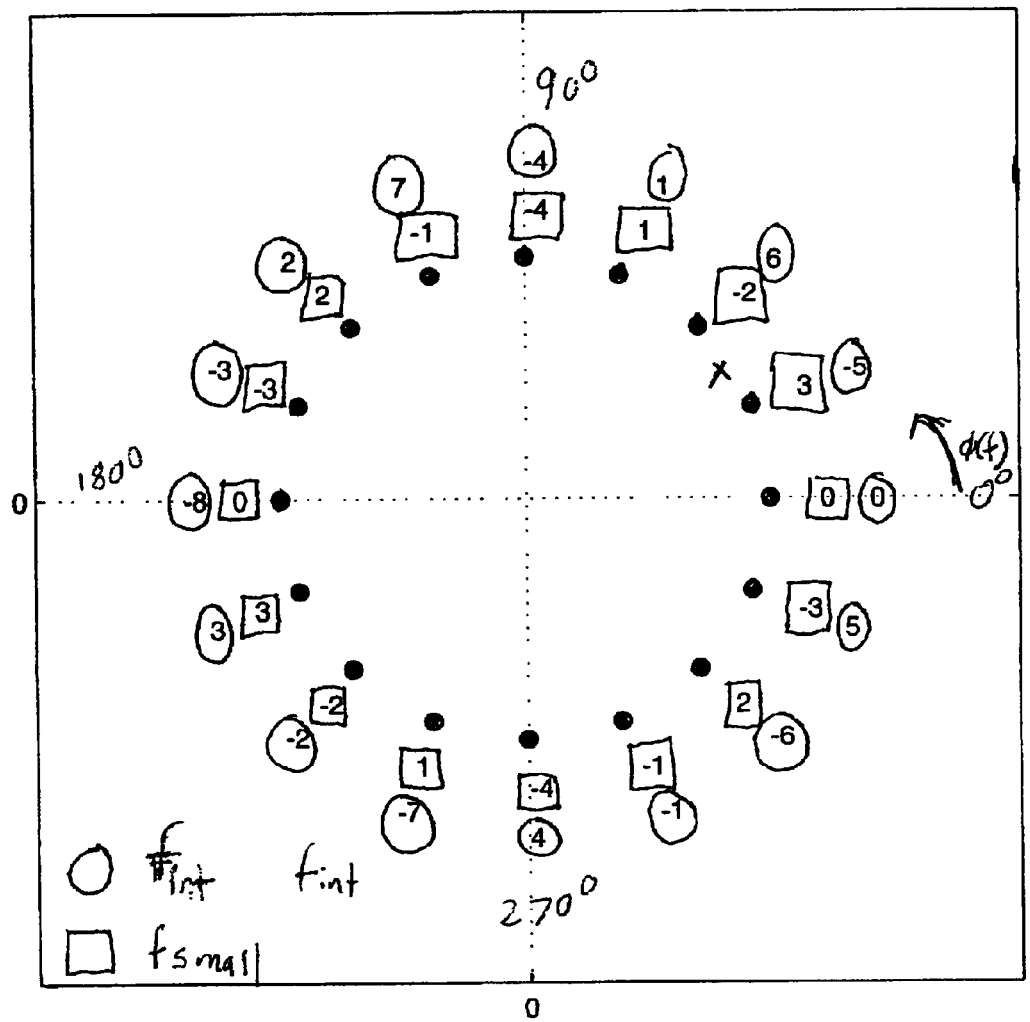
FIG. 6 depicts the use of phase offset between training tones of successive bursts to determine large frequency offset.

FIG. 6 depicts possible values of $\phi(f_{\text{int}})$ for various integer offsets in a representative system where N=128, v=16, and L=8. There are 16 possible values for $\phi(f_{\text{int}})$ depicted in a circle in the complex plane. The outer circle of numbers gives $f_{\text{int}}$ for each $\phi(f_{\text{int}})$ value. The inner circle of numbers indicates the small integer offset value, $f_{\text{small}}$ associated with each $\phi(f_{\text{int}})$ value. In the example, there are two possible $\phi(f_{\text{int}})$ values for each value of $f_{\text{small}}$. It will be seen that the $\phi(f_{\text{int}})$ values in theory uniquely identify the total integer offset value. However, there can be a relatively small difference (e.g., <90 degrees) in $\phi(f)$ values for consecutive values of total integer offset giving rise to noise susceptibility if one attempts a direct mapping from the received $\phi$ value to $f_{\text{int}}$.

In one embodiment, a two step procedure rather than a direct mapping is used to determine integer frequency offset based on a measured phase offset, $\hat{\phi}$. The small integer frequency offset, $f_{\text{small}}$ is determined based on the cost function magnitude described above. The phase offset, $\hat{\phi}$ is measured at step 408. Only the $\phi(f_{\text{int}})$ values in FIG. 6 corresponding to the determined small integer frequency offset are considered further. The total frequency integer offset, $f_{\text{int}}$ is then determined to be the value associated with the remaining $\phi(f_{\text{int}})$ value closest to the measured phase offset, $\hat{\phi}$ at step 410.

Consider an example where the $\hat{\phi}$ value is 30 degrees as marked with the "x" in FIG. 6 and $f_{\text{small}}$ as measured based on cost function magnitude is −4. Only $\phi(f_{\text{int}})$ values 90 degrees and 270 degrees correspond to this value of $f_{\text{small}}$. The $\phi(f_{\text{int}})$ value of 90 degrees is closest in angle to the received $\phi$ value and therefore $f_{\text{int}}$ is −4.

Because the phase shift, $\phi$, wraps every $2\pi$ radians, not all frequency offsets are uniquely identifiable. The range of identifiable frequency offsets is equal to $\pm f_b/2L$ as measured in Hz and $\pm N/2L$ as measured in frequency domain symbol widths, where $f_b$ is the baseband sampling rate and L is a power of 2.

The following table shows the achievable acquisition range in frequency domain symbol widths and in KHz for various combinations of $f_b$, N, and v for L=8. The last column of the table gives the number of values of $\phi$ corresponding to the same small integer offset. This value serves as an indication of the robustness of the large integer offset technique to noise and interference since the greater the number of points sharing the same small integer offset, the more closely spaced they will be on the circle of FIG. 6.

| $f_b$ (MHz) | N | v | L | Range in Symbol Widths = ±N/2L | Range in KHz = ±$f_b$/2L | Small integer offset Ambiguity |
|---|---|---|---|---|---|---|
| 1.5 | 128 | 16 | 8 | 8 | 93.75 | 2 |
| 1.5 | 256 | 32 | 8 | 16 | 93.75 | 4 |
| 3 | 128 | 16 | 8 | 8 | 187.5 | 2 |
| 3 | 256 | 16 | 8 | 16 | 187.5 | 2 |
| 3 | 256 | 32 | 8 | 16 | 187.5 | 4 |
| 3 | 512 | 64 | 8 | 32 | 187.5 | 8 |

-continued

| $f_b$ (MHz) | N | v | L | Range in Symbol Widths = ±N/2L | Range in KHz = ±$f_b$/2L | Small integer offset Ambiguity |
|---|---|---|---|---|---|---|
| 6 | 256 | 32 | 8 | 16 | 375 | 4 |
| 6 | 512 | 32 | 8 | 32 | 375 | 4 |
| 6 | 512 | 64 | 8 | 32 | 375 | 8 |
| 6 | 1024 | 128 | 8 | 64 | 375 | 16 |

An equivalent large offset estimation technique first finds a noisy estimate of the phase offset, $$\hat{\phi}$$

relative to one of the points in FIG. 6 corresponding to the measured small integer offset:

$$\hat{\hat{\phi}} = Le_{f_{small}} - \left[2\pi f_{small} \frac{v+L}{N}\right] \mod 2\pi$$

Then the phase offset closest to the above corrected phase offset is selected from among the phase offsets corresponding to the measured small integer frequency offset. That is, $$\phi_j = \left[2\pi j \frac{v+L}{N}\right] \mod 2\pi, \text{ for and}$$

$$j = [-f_{max}, -f_{max} + N/v, -f_{max} + 2N/v, \ldots f_{max}],$$

$$f_{large} = \arg\min_j |\overline{\phi}_j - \hat{\phi}|^2.$$

The total integer frequency offset is then the total of the large integer and small integer offsets.

At step 412, frequency control block 508 adjusts the operating frequency of variable frequency oscillator 506 to correct for both the large and small integer offsets as determined by integer frequency offset processing block 518. The receive frequency of receiver 118 is then aligned to the transmit frequency of transmitter 106. The output of variable frequency oscillator 506 can then serve as a frequency synchronization signal to transmitter 116 so that transmitter 116's transmission frequency will then be locked to the transmission frequency of transmitter 106. A signal processing block 522 performs further signal processing on the frequency domain training and data symbols to recover transmitted data. This processing includes estimation of the channel response and correction of the received data symbols for the estimated channel response.

It is understood that the examples and embodiments described herein are for illustrative purposes and that various modifications or changes in light thereof will be suggested to persons skilled in the art and are to be included within the spirit and purview of this application and scope of the appended claims and their full scope of equivalents. For example, the present invention may be applied to wired systems rather than wireless systems. Also, it will be appreciated that the present invention may be applied to receiver systems that incorporate input from multiple antennas. All publications, patents and patent applications cited herein are hereby incorporated by reference.

What is claimed is:

1. In an orthogonal frequency division multiplexing (OFDM) communication system, a method for frequency synchronizing a second node to a first node, said method comprising:

receiving a series of time domain OFDM bursts from said first node at said second node;

converting said series of time domain OFDM bursts into frequency domain OFDM bursts, said frequency domain OFDM bursts including selected symbols having known transmitted values;

determining phase differences between ones of said frequency domain OFDM bursts for said selected symbols; and determining coarse frequency offset between said first node and said second node based on said phase differences.

2. The method of claim 1 wherein said selected symbols having known transmitted values comprise training symbols used for estimating channel response.

3. The method of claim 1 wherein at least one of said series of time domain OFDM bursts comprises N time domain symbols, a cyclic prefix that assures orthogonality of OFDM frequency domain subchannels and a supplemental cyclic prefix that causes measurable inter-burst phase differences indicative of frequency offset.

4. The method of claim 1 further comprising:

varying a receive frequency of said second node to correct said coarse frequency offset.

5. In an orthogonal frequency division multiplexing (OFDM) communication system, a method for frequency synchronizing a second node to a first node, said method comprising:

receiving a series of time domain OFDM bursts from said first node at said second node;

converting said series of time domain OFDM bursts into frequency domain OFDM bursts, said frequency domain OFDM bursts including selected symbols having known transmitted values;

determining inter-burst phase differences for said selected symbols;

determining coarse frequency offset between said first node and said second node based on said phase differences;

wherein at least one of said series of time domain OFDM bursts comprises N time domain symbols, a cyclic prefix that assures orthogonality of OFDM frequency domain subchannels and a supplemental cyclic prefix that causes measurable inter-burst phase differences indicative of frequency offset, said method further comprising:

determining fractional symbol width frequency offset based on correlating said supplemental cyclic prefix to a corresponding segment of said N time domain symbols; and varying a receive frequency of said second node to correct said fractional symbol width frequency offset.

6. The method of claim 5 further comprising:

determining small integer symbol width frequency offset based on positions of said selected symbols having known transmitted values; and varying said receive frequency to correct said small integer symbol width frequency offset.

7. In an orthogonal frequency division multiplexing (OFDM) communication system, a method for frequency synchronizing a second node to a first node, said method comprising:

receiving a series of time domain OFDM bursts from said first node at said second node;

converting said series of time domain OFDM bursts into frequency domain OFDM bursts, said frequency domain OFDM bursts including selected symbols having known transmitted values;

determining inter-burst phase differences for said selected symbols, determining coarse frequency offset between said first node and said second node based on said phase differences, varying a receive frequency of said second node to correct said coarse frequency offset; and wherein said receive frequency is varied to correct said fractional symbol width offset prior to determining small integer symbol width frequency offset and coarse frequency offset.

8. In an orthogonal frequency division multiplexing (OFDM) communication system, apparatus for frequency synchronizing a second node, to a first node, said apparatus comprising:

a converter that converts a series of time domain OFDM bursts received from said first node at said second node into frequency domain OFDM bursts, said frequency domain OFDM bursts including selected symbols having known transmitted values; and an integer frequency offset estimation block that determines phase differences between ones of said frequency domain OFDM bursts for said selected symbols and determines coarse frequency offset between said second node and said second node based on said phase differences.

9. The apparatus of claim 8 wherein said selected symbols having known transmitted values comprise training symbols used for estimating channel response.

10. The apparatus of claim 8 wherein at least one of said series of time domain OFDM bursts comprises N time domain symbols, a cyclic prefix that assures orthogonality of OFDM frequency domain subchannels and a supplemental cyclic prefix that causes measurable inter-burst phase differences indicative of frequency offset.

11. The apparatus of claim 8 further comprising:

a frequency control block that varies a receive frequency of said second node to correct said coarse frequency offset.

12. In an orthogonal frequency division multiplexing (OFDM) communication system, apparatus for frequency synchronizing a second node to a first node, said apparatus comprising:

a converter that converts a series of time domain OFDM bursts received from said first node at said second node into frequency domain OFDM bursts, said frequency domain OFDM bursts including selected symbols having known transmitted values;

an integer frequency offset estimation block that determines inter-burst phase differences for said selected symbols and determines coarse frequency offset between said second node and said second node based on said phase differences;

wherein at least one of said series of time domain OFDM bursts comprises N time domain symbols, a cyclic prefix that assures orthogonality of OFDM frequency domain subchannels and a supplemental cyclic prefix that causes measurable inter-burst chase differences indicative of frequency offset, said apparatus further comprising:

a fractional frequency offset estimation block that determines fractional symbol width frequency offset based on correlating said supplemental cyclic prefix to a corresponding segment of said N time domain symbols; and a frequency control block that varies a receive frequency of said second node to correct said fractional tone width frequency offset.

13. The apparatus of claim 12, wherein said integer frequency offset estimation block determines small integer symbol width frequency offset based on positions of said selected symbols having known transmitted values; and wherein said frequency control block varies said receive frequency to correct said small integer symbol width frequency offset.

14. In an orthogonal frequency division multiplexing (OFDM) communication system, apparatus for frequency synchronizing a second node to a first node, said apparatus comprising:

a converter that converts a series of time domain OFDM bursts received from said first node at said second node into frequency domain OFDM bursts, said frequency domain OFDM bursts including selected symbols having known transmitted values;

an integer frequency offset estimation block that determines inter-burst phase differences for said selected symbols and determines coarse frequency offset between said second node and said second node based on said phase differences;

a frequency control block that varies a receive frequency of said second node to correct said coarse frequency offset; and wherein said receive frequency is varied to correct said fractional symbol width offset prior to determining small integer tone width frequency offset and coarse frequency offset.

15. In an orthogonal frequency division multiplexing (OFDM) communication system, apparatus for frequency synchronizing a second node to a first node, said apparatus comprising:

means for receiving a series of time domain OFDM bursts from said first node at said second node;

means for converting said series of time domain OFDM bursts into frequency domain OFDM bursts, said frequency domain OFDM bursts including selected symbols having known transmitted values;

means for determining inter-burst phase differences for said selected symbols; and means for determining coarse frequency offset between said first node and said second node based on said phase differences.

* * * * *